May 15, 1951  J. J. FILLIUNG, JR  2,552,625
ELECTRICALLY OPERATED FLUSH VALVE
Filed March 11, 1946  2 Sheets-Sheet 1

INVENTOR.
Jacques J. Filliung Jr.
BY Parker + Carter
attorneys

May 15, 1951   J. J. FILLIUNG, JR   2,552,625
ELECTRICALLY OPERATED FLUSH VALVE
Filed March 11, 1946   2 Sheets-Sheet 2

INVENTOR.
Jacques J. Filliung Jr.
BY Parker + Carter
attorneys

Patented May 15, 1951

2,552,625

UNITED STATES PATENT OFFICE 2,552,625

ELECTRICALLY OPERATED FLUSH VALVE

Jacques J. Filliung, Jr., Chicago, Ill., assignor to Sloan Valve Company, Chicago, Ill., a corporation of Illinois Application March 11, 1946, Serial No. 653,507

7 Claims. (Cl. 161—7)

This invention relates in general to the operation of valves and more particularly to the automatic operation of flush valves in sanitary systems, and the principal object of the invention is to provide new and improved means for electrically operating flush valves.

In many plumbing installations it is desirable for sanitary reasons that the flush valves be operated automatically at periodic intervals rather than manually after each use of the fixture. This is particularly true where the flush valves are utilized for the flushing of urinal fixtures. In plumbing installations where manually operated urinal flush valves are used it has been observed that the flush valves have not always been operated after the use of the urinal due principally to the reluctance of the user touching the operating handle of the flush valve, or to his neglect to do so. In any event after such conditions prevailed for any length of time, the urinal fixture became foul and offensive, constituting a potential health hazard. It is accordingly an object of the present invention to provide new and novel means whereby the flush valves are automatically operated at periodic intervals without the intervention of the human element, so that the urinal fixtures are at all times maintained in a clean and sanitary condition.

Attempts have been made in the past to automatically operate flush valves by means of electrical devices such as solenoids but these have uniformly proved impractical because when connected to alternating current of commercial frequency, solenoids have a tendency to hum and chatter which noise is propagated throughout the plumbing system of a building and is extremely objectionable. In addition the power required to trip the flush valve necessitates a relatively large and expensive size solenoid to operate its plunger, which plunger also strikes with a loud annoying bang at each end of its stroke. Because the solenoid requires a comparatively large amount of current to operate, fewer can be connected together in a common circuit by standard size wires and conduits, and the cost of an installation of this type is therefore comparatively high.

The foregoing disadvantages are all overcome by the present invention in which small electric motors are arranged to actuate the flush valves. The use of a motor and associated gearing enables a relatively greater power output to be developed; the consumption of current is small; the operation is practically noiseless; and the installation costs are economical. Other advantages will be apparent hereinafter.

It is an object of the invention to provide a new and novel electric motor mechanism for automatically operating a flush valve.

A further object is to design an electric motor for operating a flush valve in which the flush valve is operated only once for each energization of the motor.

Another object is to provide a rotatable cam means in an electric motor for operating a flush valve in which the cam means is prevented from operating the flush valve more than once for each energization of the motor and wherein a retroactive movement is imparted to the cam in the event it attempts to overrun.

An additional object is to provide a motor for operating a flush valve in which the motor is arranged to be energized by commercial alternating current of 115 volt 60 cycle frequency, and is geared to provide a final shaft speed of preferably 10 R. P. M. so that an impulse of six seconds or less duration will provide one full rotation. A timing arrangement is provided for controlling the operation of the motor at predetermined intervals for the required energizing duration.

A further object of the invention is to provide new and improved means for supporting an electric motor upon a flush valve together with a novel housing or casing for the motor carried by the support.

Another object is to provide an electric motor for automatically operating a flush valve together with means for manually operating the same independent of the automatic operating means.

An additional object is to design a motor control circuit arrangement in which the flush valve motors are operated at predetermined time intervals.

With the above and other objects in view, the invention comprises certain features of construction and operation of the parts and assemblies which will hereinafter be described and pointed out in detail in connection with the accompanying drawings wherein.

Figures 1, 6:
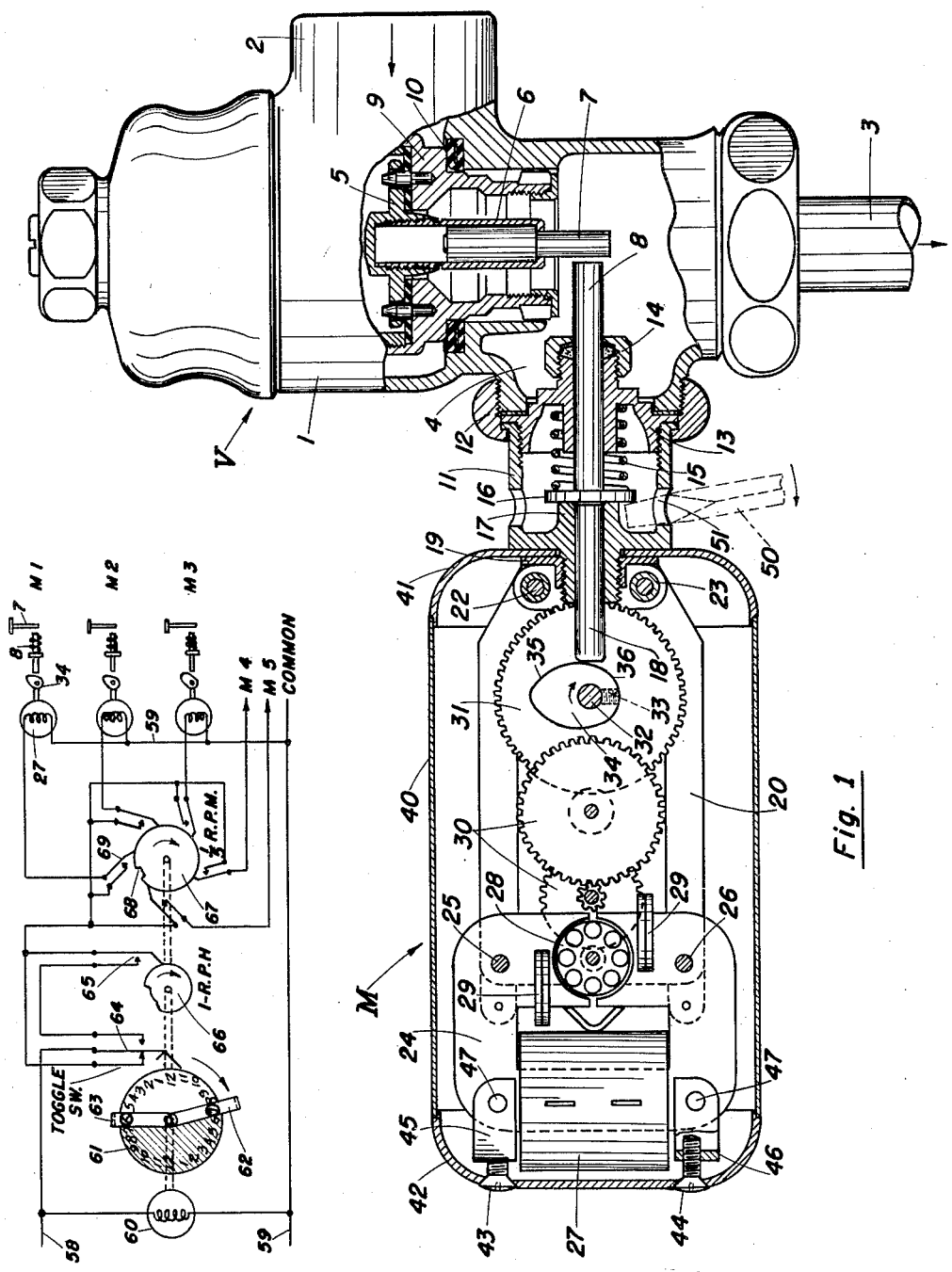
Fig. 1 is a sectional view along the line 1—1 of Fig. 2 of an electrical device in the form of a motor, together with a flush valve operated thereby.
Fig. 6 is a circuit diagram of a timing arrangement for controlling the operating periods of the motor.

Referring now more particularly to the drawings, Fig. 1 illustrates a preferred embodiment of the invention showing a small electric motor indicated generally by the reference character M, and a conventional type of the flush valve indicated by reference character V. The flush valve V comprises a body 1 having the usual inlet 2 and outlet 3, as well as an opening 4 serving for the attachment of the motor M. The operating mechanism of the flush valve includes an auxiliary tiltable valve 5 having a sleeve 6 secured thereto and in which a stem portion 7 is adapted to telescope. The stem 7 in the operation of the valve is engageable by the valve operating member or plunger rod 8 to tilt the auxiliary valve 5 from its seat in the well-known manner and reduce the water pressure on the upper side of the piston 9, thereby causing the piston 9 to move upward from its seat 10, permitting water flow through the valve body from the inlet 2 to the outlet 3. After each operation the auxiliary valve 5 resumes its seated position and the piston 9 is gradually closed upon the valve seat 10, shutting off the flow.

The motor mechanism M is supported from the opening 4 in the flush valve V by means of a hollow socket member 11, which is rigidly clamped to the opening 4 by means of the coupling nut 12 threaded onto the body 1. Within the socket member 11 there is threaded a bushing 13 of irregular shape having an axial opening therein serving as a bearing support for the plunger rod 8. Attached to the coupling 13 at its forward end and surrounding the plunger 8 is a suitable packing nut 14. A compression spring 15 has one end in abutting relationship with the bushing 13 and the other end against a headed portion 16 on the plunger rod 8, so that the spring 15 under its expanded condition presses the head 16 against a shoulder 17 formed in the bottom of socket member 11. In its normal position the end of the plunger rod 8 is out of engagement with the auxiliary valve stem 7 as shown. Extending axially through the bottom of the socket member 11 and having one end resting against the head 16 of the plunger rod 8 is a reciprocal pin 18. A shank portion on the bottom of socket member 11 is threaded into a U-shaped bracket 19 (see Fig. 2), the opposite ends of which bracket are rigidly secured to the ends of side motor frames 20 and 21. The supporting means for the bracket 19 consists of a pair of elongated pins 22 and 23 riveted over on the outside of the motor frames 20 and 21, and enclosed in sleeve members between the motor frames and which serve as spacers. With the foregoing arrangement it is seen that the socket member 11 serves to support the complete motor assembly M in the opening of the flush valve V.

The motor M is of the synchronous shaded-pole type well known in the art, and includes generally the laminated core structure 24 of ring-shaped construction, to which one end of each of the motor frame members 20 and 21 are clamped as by the rivets 25 and 26. One leg of the motor core 24 is encircled by the motor winding 27 suitably insulated and having a pair of wire terminals secured thereto. Between the open end of the core 24 and opposite the side from the winding 27 there is arranged the usual rotating commutator 28, which is adapted to be rotated in well known manner whenever the winding 27 is energized to produce a magnetic circuit through the core 24 and under the influence of the shading poles 29. The commutator 28 is provided with a spur gear which drives a series of reduction gears 30 and a final gear 31. The gear 31, commutator 28, as well as all the other gears 30, are each journaled in the side motor frames 20 and 21, as shown more clearly in Fig. 2. Gear 31 is secured to the final shaft 32 which is adapted to be rotated at a speed of preferably 10 revolutions per minute. Also secured to the final shaft 32 by means of a set screw 33 is a cam member 34, provided with a cam-shaped contour 35, the rise and drop portions of which are arranged to contact the lefthand end of pin 18 whenever the cam is rotated.

Figure 3:
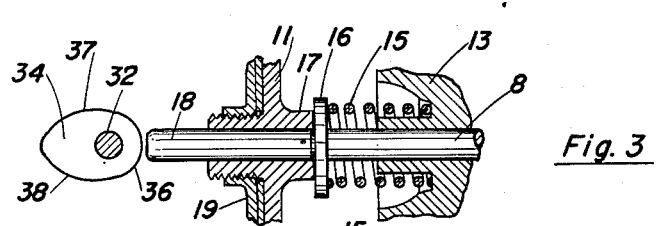
Fig. 3 is a fragmentary portion of the motor cam arrangement shown in an idle position.
Figure 4:
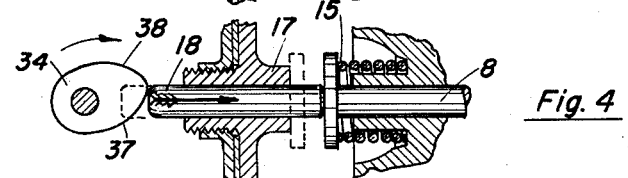
Fig. 4 is a similar view showing the cam actuating the valve plunger.
Figure 5:
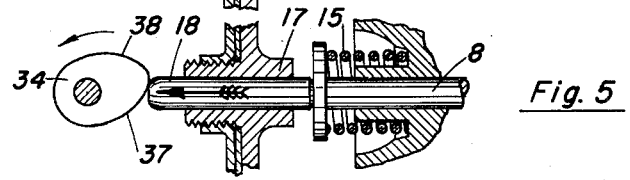
Fig. 5 is a view showing the cam in its retroactive movement.

Referring particularly to Figs. 3, 4 and 5, it will be noted in Fig. 3 that a portion of the cam surface indicated at 36 is in the idle position of the cam and out of engagement with the pin 18. This portion extends for approximately 180 degrees of the cam's orbit of rotation and insures that the motor will be enabled to get up full speed before the rise portion 37 of the cam engages the end of pin 18, as shown in Fig. 4.

In the normal operation of the motor in controlling the operation of the flush valve V, it is preferable that the motor be energized from a source of commercial current of approximately 115 volts and of a frequency of 60 cycles. It has been determined that with the gear ratio providing a final shaft speed of 10 R. P. M. to the cam 34, the flush valve will be operated to produce a flushing action which very closely simulates the action produced by a customary manual action of the flush valve when a handle is screwed into the flush valve opening 4 in place of the motor M. Upon energization of motor winding 27 the commutator 28 and the gears 30 and 31 are rotated and actuate cam 34 to engage its rise portion 37 with the end of pin 18 after the motor has assumed its full speed. The pin 18 is thereby given a forward thrust by the cam 34, so that it contacts its opposite end with the head 16 of plunger 8, causing plunger 8 to contact the auxiliary valve stem 7 and tilt the head 5 off its seat. This action results, in the well-known manner, in the upward movement of the valve piston 9 from its seat and permits the water to flow from inlet 2 to outlet 3 to flush the urinal or other fixture to which the valve is connected. A further result of the forward thrust of plunger rod 8 is the compression of spring 15, which spring, when the cam 34 has rotated so that its highest rise portion has moved beyond the end of pin 18, will cause all of the parts including the plunger 8 and pin 18 to be moved backward to their normal position.

Under ordinary conditions all of the gears and their bearings are fairly "tight" or are constituted such that very little or no over-riding or forward motion of the gears and cam takes place due to their momentum, after the motor circuit is broken. Under such conditions, remembering that the motor is energized by a 60 cycle alternating current and the final shaft speed is 10 R. P. M., it would require an energization of the motor for exactly six seconds to complete one full revolution of the cam 34. Therefore, the result will be that the cam 34 is stopped each time in a different position. In other words, it would be impossible to halt its rotation at exactly the same position each time the motor is energized. This will result in the cam being stopped progressively to different positions either forward or backward so that after a time the operation of the motor would result in either the failure of a flush valve operation or a double operation would take place for each energization of the motor. Also the cam may assume a position where it is holding the pin 18 slightly forward to only "crack" the auxiliary valve 5. This is an undesirable operation because if the auxiliary valve 5 is only slightly "cracked," the main piston valve will not open completely from its seat for a full operation, but will continue to pass a small amount of water into the plumbing fixture until the next operation of the motor.

To overcome the above disadvantages, and in accordance with one of the features of the invention, advantage is taken of the over-running or momentum action of the gears which are so constructed and arranged that they do not bind in their bearings or when they mesh, but are freely rotatable. With such an arrangement an impulse of six seconds duration for the motor is not required. It has been determined that an energization of from three to five seconds, or any intermediate duration, will result in one full flushing operation of the valve V for each operation of the motor. This result is accomplished by utilizing the restoring effect of the compression spring 15. Referring to Fig. 3, this shows the cam 34 in one of its idle positions, which position may be the same however as that shown in Fig. 1, that is the dwell surface 36 is out of contact with the end of the pin 18. As pointed out, this insures that the motor will get up to speed before the rise portion 37 engages the pin 18. After the cam has moved pin 18 inward, as shown in Fig. 4, for a substantial distance to trip the flush valve, the compression spring 15 is compressed a considerable amount and has energy stored in to its maximum extent. As the highest rise portion of the cam rotates forward beyond the end of pin 18, the motor may or may not still be energized. If it is energized at this time, the spring 15 assists the motor and forces pin 18 against the drop portion 38 of the cam, resulting in speeding the forward movement of the cam. If the current however is disconnected from the motor at this time, this action will insure that the cam is driven forward to its normal position, along with the gear train, so that it cannot stop anywhere in engagement with its rise or drop surface in contact with the end of pin 18.

Assume that the cam has rotated sufficiently under action of the spring 15 or its own momentum after the motor is deenergized, to the position shown in Fig. 5. In this case, the end rise portion 37 will bump up against the end of the pin 18 and tend to compress spring 15. Spring 15, however, is sufficiently strong so that it will force the pin backward against the rise portion 37 of the cam to cause the same to assume a retroactive movement as shown, forcing the cam and the gears backward so that the cam is rotated to the position shown in Fig. 1 or Fig. 3, for example, where it stops. The slight movement of pin 18 has no effect at this time because the valve is now flushing.

Referring again to Fig. 3, it will be seen that when the cam is in one of its idle positions, as shown, it would require slightly more than a 180 degree rotation to trip the valve, and this means that approximately a four second energization of the motor would be sufficient to accomplish this. In the position of the cam shown in Fig. 1, it would require an energization of the motor of approximately three seconds duration. Experiments have determined that the motor when operated with impulses of anywhere from three to five seconds, together with the action of the spring 15, will cause the cam 34 to always assume the general position shown in Fig. 1. Should it occur for some reason that the cam 34 came to rest with its highest rise portion (dead center) in engagement with pin 18, a full flushing operation would result because the auxiliary valve 5 would be fully tilted. However, it would come to rest in the valve closed position with its stem 7 on top of the now forwardly positioned plunger rod 8 and telescoped in the sleeve 6. Under this condition the valve V would not continue to flush until the next operation of the motor.

It is preferable that the motor M be completely enclosed to make it moisture-proof, as well as for protection and appearance purposes. This is accomplished by enclosing it within a tubular casing 40 held in position between two cup-shaped plates 41 and 42. The end plate 41 is rigidly clamped between motor bracket 19 and the bottom of socket member 11, while the end plate 42 is held in position directly against the end of the motor by screws 43 and 44 threaded into U-shaped brackets 45 and 46, which in turn are riveted to the motor core 24 by rivets 47. This enclosure is a unitary structure completely surrounding the motor, the whole being rigidly supported from the socket member 11.

Figure 2:
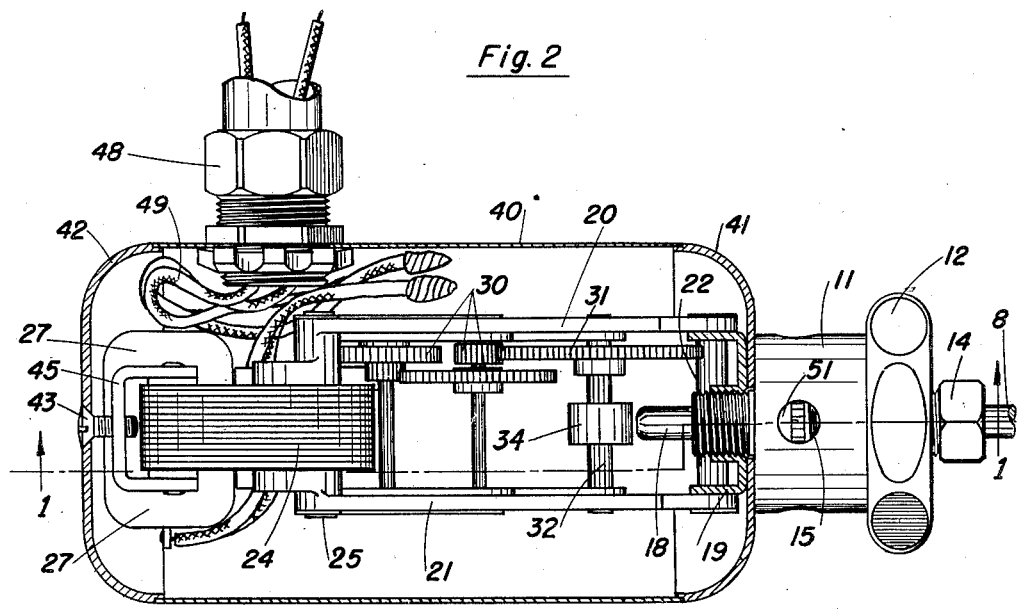
Fig. 2 is a sectional top view of the electric motor assembly only.

The electrical connections for the motor are passed through an opening in the tubular casing 40, through the conduit connector 48, through which the wires 49 pass, as shown in Fig. 2. Sufficient space is provided between the motor frame 20 and the casing 40 so that proper connections between the motor and the conduit wires can be made. This is readily accomplished by removing the end screws 43 and 44, and taking off end plate 42 to permit access to the end of the motor.

It is desirable during the installation of the motor and flush valve, and for testing purposes subsequently, that the flush valve be operated independent of the motor M. This may readily be accomplished by inserting a screw driver, indicated diagrammatically at 50 in Fig. 1, into any one of a series of holes 51, arranged circumferentially around the socket member 11. Shifting the screw driver 50 in the direction of the arrow results in moving the head 16 of plunger 8 in a right-hand direction, causing tilting of the auxiliary valve 5 and operation of the flush valve. Another important purpose for which the openings 51 are provided is to insure that any leakage which may seep past the packing nut 14 into the interior of socket 11 will pass out of these openings. In this manner, the motor structure is protected from moisture.

Referring now particularly to Fig. 6, it is desirable that the motor M operate the flush valve V at recurring predetermined periods, for example, during the day-time portion when frequent use of the urinals is made, it is good practice that they be flushed every five minutes, while at night when infrequent use is made of the urinals, they can be flushed once each hour. This results in a saving of water and maintains the urinals in a sanitary clean condition. To control the motor or a plurality of them, the timing circuit arrangement shown diagrammatically in Fig. 6 is provided. This timing mechanism includes a source of commercial current of 115 volts, 60 cycles, connected to the lead in wires 58 and 59, across which the synchronous motor 60 is at all times connected. The motor 60 drives by means of suitable gearing (not shown) a day-night clock dial 61 having a pair of adjustable arms 62 and 63, arranged on its face. These arms 62 and 63 are adapted to shift a toggle snap switch 64 back and forth, depending on their adjustment or time of day. Such construction is well known in the timing art. Another pair of contacts 65 are adapted to be closed by a rotatable cam 66 suitably geared to the motor 60 to provide one revolution per hour. The notch in the cam 66 is arranged to maintain the contacts 65 closed for a period of preferably six minutes. A second cam 67 is also geared to the motor 60 and rotates at a speed of one-fifth R. P. M. or one revolution every five minutes. This cam is provided with a notch 68 of a width sufficient to provide a closure of a series of contacts 69 arranged around the periphery of cam 67, so that these contacts are closed anywhere from three to five seconds. Each of the contacts, such as 69, are adapted to control the operation of an individual motor M, indicated diagrammatically at M1, M2, M3, etc. Any number of these contacts may be provided around the cam 67 to control their associated motors.

The operation of this circuit arrangement is as follows:

Assume that the day-night dial 61 has rotated and contacted toggle switch 64 with the arm 63 at six o'clock in the evening. This shifts over the normal open set of contacts 64 and prepares a circuit for contacts 65 from line 58. Each time the notch of cam 66 engages contact 65, the contacts close and a circuit is prepared via contact 69 to the motor M1 and back over the lead 59. When the five-minute cam 67 rotates its notch 68 to effect the closure of contact 69, the motor M1 is operated. Each one of the other contacts such as 69 are similarly operated in sequence over the above circuit path, as long as contacts 65 remain within the notch of cam 66 and the associated flush valve motors M2, M3, M4, M5, etc. are operated in turn. This condition will prevail once each hour during the night period for example. When the dial 61 rotates its arm 62 into engagement with toggle switch 64 at seven o'clock in the morning, the toggle switch is snapped back closing the normally closed contact 64 again. This action by-passes the current from contact 65 and the circuit path extends direct through contact 69 through the motor M1 and all the other motors whenever notch 68 engages the associated contacts 69. This will prevail for every five minutes throughout the day-time period.

Due to the construction and arrangement of the operating cam 34 of the motor M and spring 15, it will be apparent that extremely accurate timing of the motor M is not necessary—that there may be any variation between the three and five second period duration when contacts 69 can be closed. This is a distinct advantage since it is practically impossible to provide a cam notch 68 in the five minute cam 67, and adjust all of the contacts 69 so that they will give accurate precise circuit closure. Since the timer motor 60 provides accurate synchronous timing, it is obvious that the motors M of all the flush valves will be reliably operated at five minute intervals throughout the day-time period and at one-hour intervals at night-time, the operation being completely automatic.

The circuit arrangement also enables the flush valves to be operated in sequence when they are arranged in a group or battery so that there will not be too great a drain upon the water supply system, thereby enabling smaller size piping to be employed.

The invention is applicable to existing installations of flush valves since it is merely required that the usual manual operating handle be unscrewed from the valve opening 4 and the motor M substituted therefor, coupling nut 12 then being tightened to the body 1.

Numerous advantages over other electrical devices such as solenoids accrue by the use of applicant's invention and the motorized operation of the flush valves. Low current consumption enables a large number of the motors to be connected in each single circuit for simultaneous operation; ample power is produced through the use of the gear ratio and cam arrangement; no change whatever is required in the flush valves from the standard types being produced; the motor is relatively quiet in operation (running only for about four seconds each five minutes), and this is important because any noise in the plumbing fixtures is usually propagated throughout the piping system; due to the relatively infrequent operation of the motors no attention such as oiling, adjusting, repairing is required, and the slight heating of the winding at each operation serves to drive moisture from the motor casing; the motor can operate continuously indefinitely without burning up and can also stall for an extended period without danger to its winding; and finally, the motors are economical to produce, greatly lowering the cost of an installation.

While a preferred embodiment has been illustrated and described, it will be apparent that many changes may be made in the general construction and arrangement of the invention without departing from the spirit thereof, and it is therefore desired that the invention be not limited to the exact disclosure, but only to the extent of the appended claims.

What is claimed is:

1. In a motor for periodically operating a valve, a valve operating member, a cam rotatable by the energization of said motor to operate said valve operating member upon each rotation thereof, said cam being normally out of contact with said valve operating member and having a variable stopping position with relation to said valve operating member, said cam adapted to continue its rotation due to its momentum after said motor is deenergized and said valve operating member is operated, and means including said valve operating member for imparting a retroactive movement to said cam for preventing said cam from again operating said valve operating member after said motor is deenergized, said cam stopping after said retroactive movement in a variable position but out of contact with said valve operating member.

2. In a motor for periodically operating a valve, a cam adapted to be rotated by the energization of said motor and capable of idle rotation after deenergization of said motor, a valve operating member arranged in the path of rotation of said cam, said cam being normally out of contact with said valve operating member and having a variable stopping position with relation to said valve operating member, said cam arranged to impart a lateral thrust to said valve operating member upon each rotation of the cam, and resilient means for restoring said valve operating member after each operation by said cam, said resilient means effective to halt excess idle rotation of said cam and to impart a retroactive rotation to said cam to thereby prevent another operation of said valve operating member, said cam stopping after said retroactive movement in a variable position but out of contact with said valve operating member.

3. In a motor for periodically operating a valve, a cam adapted to be rotated in a forward direction upon the energization of said motor, a valve operating member having one end arranged in the path of rotation of said cam, said cam being normally out of contact with said valve operating member and having a variable stopping position with relation to said valve operating member, the rotation of said cam imparting a lateral thrust to the end of said valve operating member, spring means for restoring said valve operating member after each operation by said cam, said spring means also effective through said valve operating member to impart a lateral thrust upon said cam member to cause the cam to rotate in a retroactive direction to a variable stopping position but out of contact with said valve operating member in case said cam overruns after the motor is deenergized.

4. In a motor for periodically operating a flush valve, a cam having a rise, drop and dwell portion thereon, said cam adapted to be rotated upon the energization of said motor, a valve operating member having one end thereof in the path of rotation of the rise and drop portions of said cam whereby the cam imparts a lateral thrust to said valve operating member upon each rotation of said cam, said cam being normally out of contact with said valve operating member and having a variable stopping position with relation to said valve operating member, means on said valve operating member for restoring the same after each operation thereof, the dwell portion of said cam being normally arranged out of engagement with said valve operating member whereby said motor is adapted to accelerate its speed before the rise portion of the cam engages the valve operating member, and said cam being propelled forward by said valve operating member after operating the same and stopping at a variable position out of contact with said valve operating member.

5. In a motor for operating a valve, a valve operating member, a cam rotatable upon energization of said motor to actuate said valve operating member, said motor arranged to operate from 60 cycles A. C. and said cam arranged to rotate 10 R. P. M. whereby a six second energization of said motor will rotate said cam one complete revolution, spring means for restoring said valve operating member after each actuation thereof by said cam member, said spring means effective to act upon said valve operating member to engage the cam and impart a retroactive rotation to said cam and thereby prevent overrunning of the same whereby said cam will come to rest in approximately the same starting position after each revolution thereof.

6. In a motor for operating a valve, said motor adapted to be operated by alternating current of 60 cycle frequency, a gear train in said motor having a final shaft speed of 10 R. P. M., a cam on said final shaft adapted to operate said valve upon each revolution thereof, means for energizing said motor at predetermined time intervals for a duration of between three and five seconds, and means acting upon said cam to stop the rotation thereof and impart a retroactive rotation to said cam to halt its movement in the same approximate position when the motor is energized within the limits of three to five seconds duration.

7. In a motor assembly for operating a flush valve, a brushless motor having a commutator and a gear train driven thereby, a cam arranged on the final gear shaft of the train, spring pressed means adapted to be engaged by said cam for operating said flush valve once for each rotation of said cam, said cam being normally out of contact with said spring pressed means and having a variable stopping position in relation therewith, said motor when energized capable of driving said gear train and cam in a forward direction of rotation, said gear train and cam capable of continuing to rotate freely due to their momentum after said motor has deenergized and said spring pressed means has operated said flush valve, said spring pressed means adapted to engage and rotate said cam and gear train in the reverse direction to a variable stopping position in the event the momentum rotates the cam and gear train to a position where the cam again engages the spring pressed means, whereby a second operation of the flush valve is prevented.

JACQUES J. FILLIUNG, Jr.

REFERENCES CITED

The following references are of record in the file of this patent:

UNITED STATES PATENTS

| Number | Name | Date |
| --- | --- | --- |
| 1,178,272 | Simke et al. | Apr. 4, 1916 |
| 1,262,976 | Pineau | Apr. 16, 1918 |
| 2,198,749 | Weber | Apr. 30, 1940 |
| 2,254,795 | Daniels | Sept. 2, 1941 |
| 2,388,990 | Nelson | Nov. 13, 1945 |
| 2,395,150 | Sloan et al. | Feb. 19, 1946 |